United States Patent [19]

Renaud

[11] Patent Number: 4,467,904
[45] Date of Patent: Aug. 28, 1984

[54] CLUTCH RELEASE BEARINGS

[75] Inventor: Pierre Renaud, Le Plessis-Trevise, France

[73] Assignee: Valeo, Paris, France

[21] Appl. No.: 251,927

[22] Filed: Apr. 7, 1981

[30] Foreign Application Priority Data

Dec. 18, 1980 [FR] France ................................. 80 26885

[51] Int. Cl.³ ............................................. F16D 23/14
[52] U.S. Cl. ................................... 192/98; 192/110 B
[58] Field of Search .................... 192/98, 110 B, 99 S; 308/233, 184 A

[56] References Cited

U.S. PATENT DOCUMENTS

| | | | |
|---|---|---|---|
| 3,390,927 | 7/1968 | Adams | 308/135 |
| 3,815,715 | 6/1974 | Maucher | 192/98 |
| 3,904,008 | 9/1975 | Sonnerat | 192/98 |
| 3,920,107 | 11/1975 | Limbacher | 192/98 |
| 4,117,916 | 10/1976 | Baker | 192/98 |
| 4,144,957 | 3/1979 | de Gennes | 192/98 |
| 4,201,282 | 5/1980 | Ernst et al. | 192/98 |
| 4,371,068 | 2/1983 | Billet | 192/110 B X |

*Primary Examiner*—Rodney H. Bonck
*Attorney, Agent, or Firm*—Charles E. Brown

[57] ABSTRACT

There is disclosed a clutch release bearing comprising a plastic operating member having an axial sleeve and a transverse flange, and a drive or thrust member comprising a ball bearing. One of the races, here the outer, is adapted to bear against a washer bearing member through an annular holding member disposed on one side of the transverse flange. Passageways are formed in the flange to provide access for an associated actuating member to the bearing member from the other side of the flange. The holding member for the bearing member preferably comprises a washer portion, a slotted annular rim divided into segments with radially outwardly extending annular lip on the free end of the rim bearing against a transverse shoulder formed on a radially inwardly extending bead at the free end of an axial rim on the operating member. Alternatively, the annular holding member may consist of a washer, or an axially extending rim.

23 Claims, 13 Drawing Figures

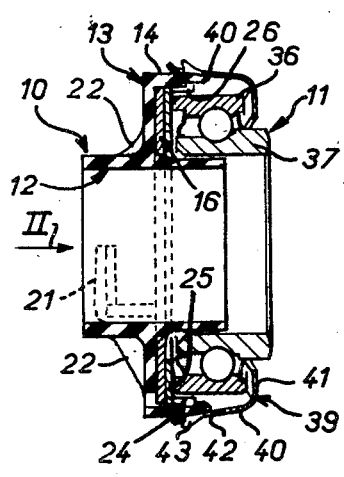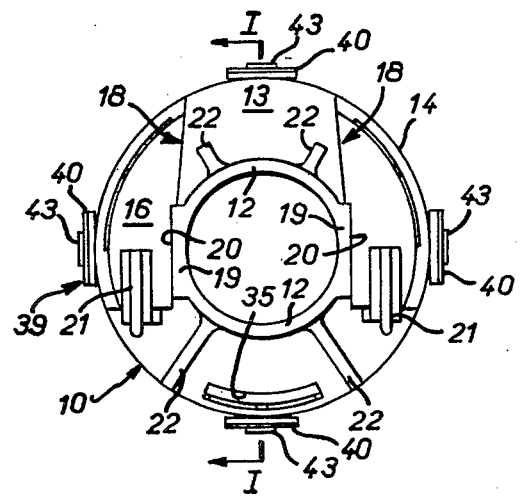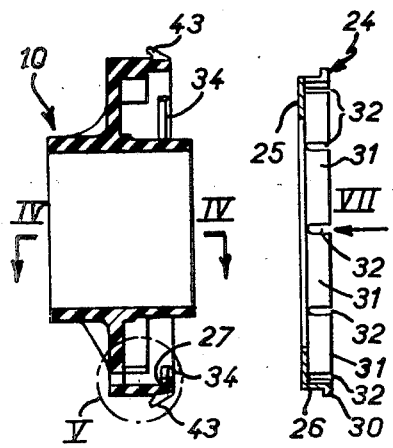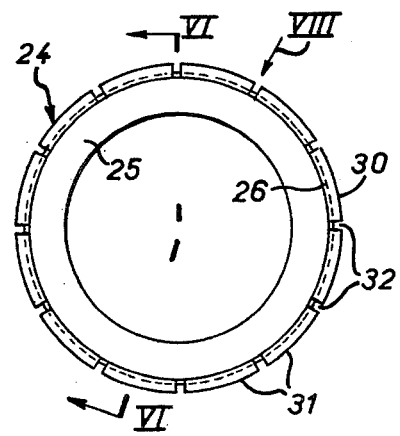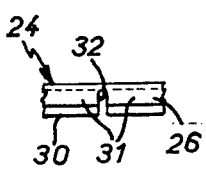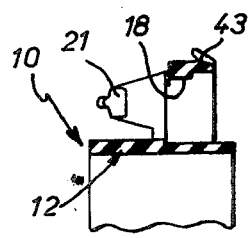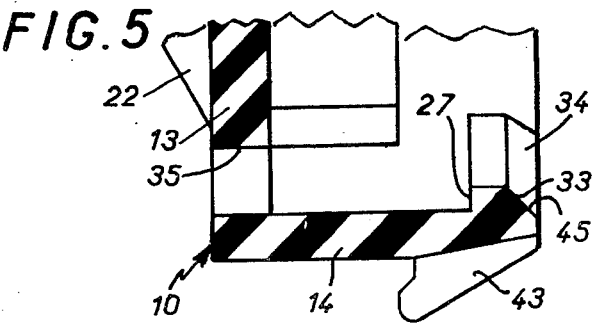

CLUTCH RELEASE BEARINGS

BACKGROUND OF THE INVENTION

The present invention relates in general to clutch release bearings, that is, devices adapted to operate the release mechanism of clutches, especially those for motor vehicles.

As is known, such clutch release bearings generally comprise an operating member which is controlled by an actuating member which is usually an actuating fork, a drive or thrust member which is urged by the operating member against the release mechanism of the clutch and coupling means for securing the drive or thrust member axially to the operating member.

In practice the operating member usually comprises a transverse flange on one side of which is mounted the actuating member and on the other side of which bears the drive or thrust member.

The present invention more particularly relates to such clutch release bearings in which the operating member is made of synthetic plastic material. To protect such a plastic operating member from the action of the actuating member which may, on account the contact pressure developed during each clutch disengagement operation, cause rapid deterioration, detrimental to long service life of the release bearing, it is common to provide a special metal bearing member against which the actuating member bears axially. Usually this metal bearing member comprises a plate which overlies the flange of the operating member on the side thereof remote from the drive or thrust member.

It has, however, been proposed to dispose the bearing member between the drive or thrust member and the transverse flange of the operating member. Such is the case, for example, in U.S. Pat. No. 3,390,927, French printed patent application No. 2,391,392 and at least some of the embodiments of U.S. patent application Ser. No. 184,629, filed Sept. 8, 1980, now U.S. Pat. No. 4,371,068 granted Feb. 1, 1983, assigned to the assignee of the present application.

In the U.S. Pat. No. 3,390,927 the bearing member to which the actuating member has access through the transverse flange of the operating member, has for this purpose local passageways of L-shaped profile necessitated by the fact that the since the clutch release bearing is not a self-centering release bearing its drive or thrust member is fitted against radial displacement on a cylindrical bearing surface of the bearing member which must be formed on an axial part of the bearing member.

Other than the fact that such an arrangement is not suited to self-centering operation in which limited radial shifting of the drive or thrust member is provided relative to the operating member in all directions in a plane perpendicular to the axis of the release bearing, it involves the use of a bearing member which is of relatively complex configuration and therefore is all the more expensive as thermal treatment is required to reinforce it against impacts, such thermal treatment not being possible before the part is in its ultimate configuration.

In French printed patent application No. 2,391,292 the bearing member is formed in one piece with one of the components of the drive or thrust member and it therefore has a relatively complex overall configuration thereby increasing production costs.

In above identified patent application Ser. No. 184,629, the bearing member comprises a part separate from the drive or thrust member but for reasons of its particular application, the bearing member has, as above, a relatively overall complex configuration and therefore is relatively expensive to manufacture.

OBJECT AND SUMMARY OF THE INVENTION

A general object of the present invention is the provision of an arrangement which permit these drawbacks to be overcome and provides other advantages as well.

According to the invention there is provided a clutch release bearing comprising a plastic operating member having a transverse flange adapted to be controlled by an actuating member, a metal bearing member against which the actuating member is adapted to bear, a drive or thrust member adapted to coact with a release mechanism of an associated clutch in response to the action of the operating member, coupling means for axially coupling the drive or thrust member to the operating member, the bearing member bearing axially against one side of the flange of the operating member turned toward the drive or thrust member, the flange having passageways providing access to the bearing member for the actuating member, and means for axially holding the bearing member on the one side of the flange including an annular holding member bearing axially against the operating member and holding the bearing member in contact with the flange.

Thus the bearing member is positively held against axial movement in either direction so that there is no risk of skewing of the bearing member or thereby noncircular or nonuniform contact of the drive or thrust member against the release mechanism of the clutch in case the action of the actuating member is not exactly symmetrical with respect to the axis of the release bearing.

According to preferred embodiment the annular holding member comprises a washer axially interposed between the drive or thrust member and the bearing member. Thus, when the clutch release bearing is of the permanent self-centering type, that is, a clutch release bearing in which the drive or thrust member is resiliently axially biased toward the flange of the operating member admits of limited transverse shifting relative to the axis of the release bearing, the annular holding member has a dual function: it positively axially maintains the bearing member and it defines, by the nature of its appropriately selected constituent material, the frictional conditions which insure holding of the drive or thrust member against shifting once the drive or thrust member is in its self-centered position.

In certain cases the annular holding member may have a third function in such self-centering release bearings, namely, radially limiting the permitted latitude of shifting of the drive or thrust member.

Further, the annular holding member insures a particularly reliable construction which may be assembled by simple axial engagement and is therefore very economical to put into service.

The features and advantages of the invention will be brought out in the description which follows, given by way of example.

BRIEF DESCRIPTION OF THE DRAWINGS

FIG. 1 is a longitudinal vertical sectional view of an embodiment of a clutch release bearing according to the invention, taken on line I—I in FIG. 2;

FIG. 2 is an elevational view taken in the direction of the arrow II in FIG. 1;

FIG. 3 a longitudinal vertical sectional view similar to FIG. 1 for the operating member of the clutch release bearing taken on its own;

FIG. 4 is a half longitudinal vertical sectional view of the operating member, taken on line IV—IV in FIG. 3;

FIG. 5 shows, on an enlarged scale, the detail enclosed in phantom line V in FIG. 3;

FIG. 6 is a longitudinal generally vertical sectional view of the holding member of the clutch release bearing, taken on its own, along line VI—VI in FIG. 7;

FIG. 7 is an elevational view of the holding member viewed in the direction of arrow VII in FIG. 6;

FIG. 8 is a fragmentary view taken in the direction of arrow VIII in FIG. 7;

DETAILED DESCRIPTION OF THE PREFERRED EMBODIMENTS

Figure 9:
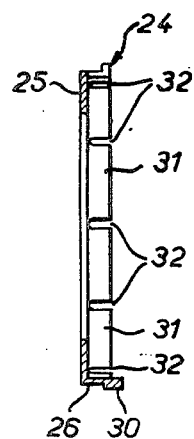
FIG. 9 is a longitudinal vertical sectional view similar to that of FIG. 6 of another embodiment of holding member.

As shown in the drawings the clutch release bearing according to the invention generally comprises, as is known per se, an operating member 10 which is controlled by an actuating member, in practice an actuating fork, not shown, and a drive or thrust member 11 which in response to the action of the operating member coacts with the release mechanism of the clutch, which is also not shown.

The operating member 10 which is of one-piece construction is made of synthetic plastic material and comprises an axial sleeve 12 and a transverse flange 13 disposed midway along the length of the sleeve in the illustrated embodiments. The flange 13 is generally annular and has on the side of the drive or thrust member 11 an axially extending annular rim 14. In the space defined between the annular rim 14 and the sleeve 12 is disposed a metal bearing member 16 against which the actuating member is adapted to bear. The metal bearing member 16 is located on the side of the flange 13 turned toward the drive or thrust member 11 and bears thereagainst.

In the illustrated embodiment of FIGS. 1-8 the bearing member 16 comprises a simple washer disposed transversely with respect to the axis of the release bearing and centered by its inner periphery against the sleeve 12 of the operating member.

To provide access to the bearing member 16 for the actuating member, the flange 13 of the operating member 10 comprises two passageways 18 disposed symmetrically with respect to a plane extending through the axis of the release bearing, see FIGS. 2 and 4.

Each of the passageways 18 is bounded partly by a boss 19 on the sleeve 12 having a plane surface 20, parallel to the axis of release bearing, adapted to guide the actuating member, see FIG. 2. Perpendicular to the plane surface 20 each of the passageways 18 is in addition bounded in part, in FIGS. 1-8 embodiment, by a right angle member 21 which protrudes axially and extends over part of the passageway and which is adapted to secure the release bearing axially in relation to the actuating member. Radial ribs 22 interconnect the sleeve 12 and the flange 13, at angularly spaced positions the radial ribs extending to the outer periphery of the flange 13 or they stop short of the outer periphery of the flange if they would otherwise cut across the passageways 18, as shown in FIG. 2.

According to the invention the means for axially holding the bearing member 16 on the drive or thrust member side of the flange 13 comprises an annular holding member 24 which, bearing axially against the operating member, holds the bearing member 16 in contact with the flange 13.

In the illustrated embodiments the annular holding member 24 is preferably of synthetic plastic material but may, as a variant, be made of steel, for example, spring steel.

In the embodiments of FIGS. 1-8 the annular holding member comprises a washer portion 25 interposed axially between the drive or thrust member 11 and the bearing member 16. In addition the annular holding member 24 comprises an axially extending annular rim 26. Preferably, as shown, the annular rim 26 of the annular holding member 24 comprises a radially outwardly extending annular lip 30 for bearing against the transverse shoulder 27 of the operating member flange. Further, in this illustrated embodiment, the annular rim 26 is divided into tongues 31 at least along part of its axial extent from its free edge by axial slots 32. Preferably these slots 32 extend to the washer portion 25 and thereby extend along the entire length of the annular rim 26.

In the embodiment of FIGS. 1-8 the transverse shoulder 27 on the operating member 10 is formed at the end of the annular rim 14 on a bead 33 projecting radially inwardly. Preferably the bead 33 comprises a plurality of separate circumferentially spaced segments 34, three as shown. Two of the segments 34 are each disposed in axial alignment with the passageways 18 in the flange 13 while the third segment 34 is disposed in axial alignment with an aperture 35 provided in the flange. During molding of the operating member 10 the passageways 18 and the aperture 35 in flange 13 accommodate punches for the molding of the segments making up the bead 34.

In the embodiments of FIGS. 1-8, as is known per se, the drive or thrust member 11 comprises a ball bearing having an outer race 36 which alone bears axially against the washer portion 25 of the annular holding member 16 and through the washer portion 25 and the bearing member against the flange 13 of the operating member 10, and having an inner race 37, free from contact with any another part which is adapted to coact with the release mechanism of the actual clutch.

Since, preferably, the release bearing is of the self-centering variety the drive or thrust member 11 is adapted to shift radially relative to the axis of the release bearing in frictional contact with the washer portion 25 of the annular holding member 24 within radial limits defined by the annular rim 26 on the holding member 24 and/or the sleeve 12 of the operating member 10. In other words, the drive or thrust member 11 is mounted for limited shifting movement relative to the axis of the release bearing.

As is known per se coupling means for axially coupling the drive or thrust member 11 to the operating member 10 are provided. In the illustrated embodiments the coupling means comprise a resilient clip 39 such as disclosed in detail in U.S. Pat. No. 4,144,957 including a plurality of axial tabs or lugs 40, four as shown, and an annular front wall 41. The axial tabs or lugs 40 of the clip 39 attach the clip 39 to the operating member. Each of the axial tabs or lugs 40 has an aperture 42 engageable with a hook 43 radially outwardly projecting from the annular rim 14 of the operating member.

The annular front wall 41 of the clip 39 comprises axially acting resilient means defined, for example, by an undulated or corrugated resilient washer, the clip 23 urges the drive or thrust member 12 and more specifically the outer race 36 thereof, as mentioned above, against the washer portion 25 of the holding member 24, thereby axially biasing the outer race 36 toward the holding member. Owing to the resilient action the sought after self-centering action is permanent, the drive or thrust member 11 maintaining its centered position relative to the axis of the release bearing when it is not subjected to any radial component.

As will be noted the assembly of the component parts of the release bearing is simply carried out by merely stacking the component parts axially on one side of the flange 13 of the operating member 10. In particular, the annular holding member 24 is very easily axially introduced into the spaced defined by the annular rim 14.

Preferably, as shown, the axial introduction is facilitated by the provision of a chamfer 45 at the free, radially inner side of the annular rim 14. Thus, as will be understood, when the annular holding member 24 is introduced, the tongues 31 defining the annular rim 26 resiliently deform inwardly as they pass over the segments 34 of the bead 33 of the operating member 10 and after clearing the transverse shoulder 27 on the bead 33 they resume their original configuration to bear axially against the transverse shoulder 27. The axial length of the tongues 31 is of course selected sufficiently elastic for such a resilient deformation and on the other hand of sufficient axial creep resistance against the thrust of the operating member, and the axial length of the annular rim 14 of the flange 13 of the operating member is determined accordingly.

In the alternative embodiment of FIG. 9 one of the tongues 31, the one situated at the bottom of the annular holding member as shown, is axially longer than the others and is thus adapted to abut circumferentially against one of the circumferential ends of the corresponding segment 34 of the operating member 10 for fixing the annular holding member 24 against rotation on the operating member, particularly during self-centering of the clutch release bearing. This arrangement prevents the washer defining the bearing member 16 from rotating and therefore reduces wear and/or prevents any possible interference with the general frictional conditions affecting shifting of the drive or thrust member 11.

This arrangement is not essential, however. On the contrary in some cases for certain uses, depending on the nature of the materials used, the rotation of the washer defining the bearing member during self-centering may be acceptable in order to distribute more uniformly the wear of the washer caused by contact with the associated actuating member.

In any event if metal-to-metal contact is desired for controlling permanent self-centering of the drive or thrust member the annular holding member is simplified down to the annular rim 26. In this case the axial slots 32 in the annular rim 26 do not extend along the entire axial length.

Thus, according to the particular conditions of use, the present invention readily lends itself to providing different coefficients of friction for permanently self-centering of such clutch release bearings.

It is, moreover, to be noted that when such a coefficient of friction is desired the annular holding member comprises a transverse washer 25 the axial extent of the latter may advantageously be reduced to what is strictly necessary for contact with the drive or thrust member 11 thereby minimizing the amount of material required for the annular holding member. The annular holding member may in this case simplify down to washer portion 25, the centering of the washer portion 25 then be insured by the axial rim 14 of the flange 13 of the operating member 10 and the washer bearing directly axially against the transverse shoulder 27 of the operating member 10, moved closer for this purpose, on the opposite side of the flange 13.

In the alternative embodiments of FIGS. 10-13, the washer which defines the bearing member 16 comprises diametrically opposed radial protuberances 50 in alignment with the passageways 18 in the flange 13 and a break in the annular rim 14 for increasing the contact area for the associated actuating member. In the illustrated embodiment the protuberances 50 which are of overall rectangular configuration extend beyond the outer periphery of the flange 13 of the operating member 10. Such an arrangement provides a larger opening for the actuating member and therefore in certain cases avoids certain obstacles which might otherwise hinder operation.

In other respects the embodiments of FIGS. 10-13 are generally the same as that of FIGS. 1-8 except for the following differences. So as not to interfere with the protuberances 50 of the bearing member 16, the axial tabs or lugs 40 of the resilient clip 39 and the hooks 43 on the rim 14 of the flange 13 are circumferentially offset relative to the protuberances 50. The passageways 18 in the flange 13 of the operating member 10 are reduced in area, limited to the width of the protuberances 50. In the flange 13 is an aperture 35 for each of the segments 34. The sleeve 12 has internal splines and only extends to the side of the flange 13 towards the drive or thrust member 11. On the other side of the flange the sleeve 12 is reduced to two bosses 19 with guiding surfaces 20 bounding the passageways 18.

Figure 10:
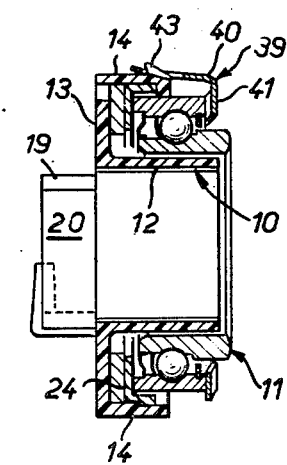
FIGS. 10 and 11 are views respectively similar to FIGS. 1 and 2 of a clutch release bearing for the embodiment of FIG. 9.
Figure 11:
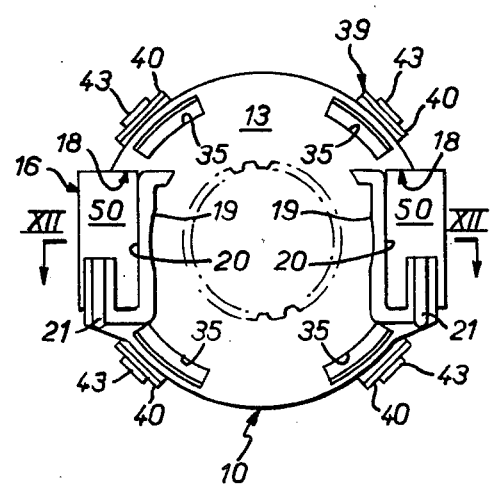
Figure 12:
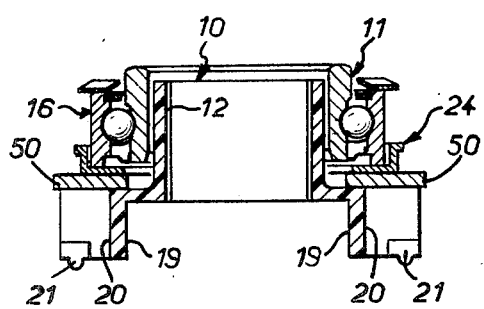
FIG. 12 is a longitudinal vertical sectional view of the clutch release bearing of FIGS. 10 and 11 taken generally along the line XII—XII of FIG. 11.

In the embodiment of FIGS. 10-12, the right angle members 21 securing the release bearing axially relative to the actuating member extends parallel to the guiding surfaces 20 as in the embodiments of FIGS. 1-8.

Figure 13:
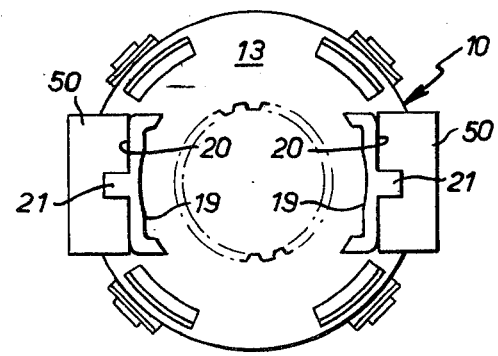
FIG. 13 is an elevational view similar to that of FIG. 11 for another modified embodiment.

In the modified embodiment of FIG. 13 the right angle portions 21 extend perpendicularly from the guiding surfaces 20. Such right angle portions may be brought axially closer to the bearing member 16 by providing corresponding notches in the associated actuating member in order to reduce the axial length of the assembly and therefore making the release bearing more compact and more sturdy.

Obviously the invention is not intended to be limited to the illustrated and described embodiments but admits of modifications and alternatives without departing from the spirit and scope of the invention.

In particular the bearing member may be of any configuration and is not limited to a simple flat washer as disclosed in aforementioned copending U.S. patent application Ser. No. 184,629 (Rene BILLET) assigned to the assignees of the present application.

Finally, the field of use of the invention, although particularly adapted to self-centering release bearings, is not limited to such release bearing but is intended to cover all types of clutch release bearings.

What is claimed is:

1. A clutch release bearing comprising a plastic operating member having a transverse flange adapted to be controlled by an actuating member, a metal bearing member against which the actuating member is adapted to bear, a drive or thrust member adapted to coact with a release mechanism of an associated clutch in response to the action of said operating member, coupling means for axially coupling said drive or thrust member to the operating member, said bearing member bearing axially against one side of said flange of said operating member turned toward said drive or thrust member, said flange having passageways providing access to said bearing member for the actuating member, and means for axially holding said bearing member on said one side of said flange including an annular holding member bearing axially in one direction against said operating member and bearing axially in the other direction against said bearing member to hold said bearing member in contact with said flange.

2. A clutch release bearing comprising a plastic operating member having a transverse flange adapted to be controlled by an actuating member, a metal bearing member against which the actuating member is adapted to bear, a drive or thrust member adapted to coact with a release mechanism of an associated clutch in response to the action of said operating member, coupling means for axially coupling said drive or thrust member to the operating member, said bearing member bearing axially against one side of said flange of said operating member turned toward said drive or thrust member, said flange having passageways providing access to said bearing member for the actuating member, and means for axially holding said bearing member on said one side of said flange including an annular holding member bearing axially against said operating member and holding said bearing member in contact with said flange, whereby the coupling force applied by said coupling means is independent of the holding force applied by said holding member.

3. A release bearing according to claim 1, wherein said annular holding member comprises an axial annular rim.

4. A release bearing according to claim 3, wherein said axially extending annular rim comprises at its free end a radially outwardly extending annular lip.

5. A release bearing according to claim 3, wherein said axial rim comprises axial slots extending from its free end along at least part of its axial length circularly dividing said axial rim into part cylindrical tongues.

6. A release bearing according to claim 5, wherein one of said tongues is longer than the other of said tongues.

7. A release bearing according to claim 5, wherein said annular holding member comprises a washer portion interposed axially between said drive or thrust member and said bearing member, and said axial slots extend up to said washer portion.

8. A release bearing according to claim 7, wherein one of said tongues is longer than the other of said tongues.

9. A release bearing according to claim 1, wherein said axial holding member bears against a transverse shoulder of said operating member at an end of said axial holding member remote from said flange of said operating member.

10. A release bearing claim 9, wherein said transverse shoulder is formed on a radially inwardly extending bead at the end of an axial rim on said operating member.

11. A release bearing according to claim 10, wherein said axial rim of said operating member has a chamfer on its free end along its radially inner side.

12. A release bearing according to claim 10, wherein said bead comprises a plurality of circumferentially spaced segments.

13. A release bearing according to claim 12, wherein said axial rim of said operating member has a chamfer on its free end along its radially inner side.

14. A release bearing according to claim 12, wherein one of said tongues is longer than the others, said longer tongue abutting circumferentially against a circumferential side of a said corresponding segment of said bead for fixing said bearing member against rotation.

15. A release bearing according to claim 14, wherein said axial rim of said operating member has a chamfer on its free end along its radially inner side.

16. A release bearing according to claim 1, wherein said drive or thrust member includes a ball thrust bearing of generally conventional configuration.

17. A release bearing according to claim 16, wherein said drive or thrust member admits of limited shifting movement in a plane generally perpendicular to the axis of the release bearing against the force applied by said coupling means to permit self-centering in case of axial misalignment with respect to the axis of rotation of the associated clutch.

18. A clutch release bearing comprising a plastic operating member having a transverse flange adapted to be controlled by an actuating member, a metal bearing member against which the actuating member is adapted to bear, a drive or thrust member adapted to coact with a release mechanism of an associated clutch in response to the action of said operating member, coupling means for axially coupling said drive or thrust member to the operating member, said bearing member bearing axially against one side of said flange of said operating member turned toward said drive or thrust member, said flange having passageways providing access to said bearing member for the actuating member, and means for axially holding said bearing member on said one side of said flange including an annular holding member bearing axially against said operating member and holding said bearing member in contact with said flange, said annular holding member comprising a washer portion interposed axially between said drive or thrust member and said bearing member.

19. A release bearing according to claim 18, wherein said annular holding member consists of a washer interposed axially between said drive or thrust member and said bearing member.

20. A clutch release bearing comprising a plastic operating member having a transverse flange adapted to be controlled by an actuating member and a rim at the outer periphery of said transverse flange, a metal bearing member against which the actuating member is adapted to bear, a drive or thrust member for coacting with a release mechanism of an associated clutch in response to the action of said operating member, coupling means for axially coupling said drive or thrust member to the operating member, said bearing member bearing axially against one side of said transverse flange of said operating member turned toward said drive or thrust member, said transverse flange having passageways forming access means to said bearing member for the actuating member, and means for axially holding said bearing member on said one side of said transverse flange including an annular holding member bearing axially against said rim of said operating member and holding said bearing member in contact with said flange.

21. A release bearing according to claim 20, wherein said holding member includes a washer portion interposed axially between said drive or thrust member and said bearing member.

22. A release bearing according to claim 20, wherein said annular holding member includes an axially extending annular rim disposed inside said operating member rim at the outer periphery of said transverse flange.

23. A release bearing according to claim 20, wherein said coupling means is attached to said rim at the outer periphery of said operating member and urges said drive or thrust member toward said transverse flange of said operating member.

* * * * *